(12) United States Patent
Higashidozono

(10) Patent No.: US 12,510,168 B2
(45) Date of Patent: Dec. 30, 2025

(54) VALVE

(71) Applicant: EAGLE INDUSTRY CO., LTD., Tokyo (JP)

(72) Inventor: Hideki Higashidozono, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 61 days.

(21) Appl. No.: 18/284,478

(22) PCT Filed: Mar. 17, 2022

(86) PCT No.: PCT/JP2022/012340
§ 371 (c)(1),
(2) Date: Sep. 27, 2023

(87) PCT Pub. No.: WO2022/209964
PCT Pub. Date: Oct. 6, 2022

(65) Prior Publication Data
US 2024/0159320 A1   May 16, 2024

(30) Foreign Application Priority Data
Mar. 29, 2021  (JP) ................................. 2021-055782

(51) Int. Cl.
*F16K 41/10* (2006.01)
*F16K 1/36* (2006.01)
*F16K 5/20* (2006.01)

(52) U.S. Cl.
CPC ................ *F16K 5/207* (2013.01); *F16K 1/36* (2013.01)

(58) Field of Classification Search
CPC ............. F16K 5/207; F16K 1/36; F16K 41/10
See application file for complete search history.

(56) References Cited

U.S. PATENT DOCUMENTS

| 231,592 A | 8/1880 | Leach | F16K 39/024 |
|---|---|---|---|
| 813,555 A | 2/1906 | Hayden | F16K 1/34 |
| 821,758 A | 5/1906 | Smith | F16K 1/46 |
| 877,865 A | 1/1908 | Ricksecker | F16K 1/34 |
| 1,170,412 A | 2/1916 | Campbell | F16K 15/20 |
| 1,449,876 A | 3/1923 | Erastus | F01L 3/20 |
| 1,614,002 A | 1/1927 | Horton | A62C 35/605 |
| 1,758,471 A | 5/1930 | Julius | F16K 1/46 |
| 1,797,036 A | 3/1931 | Wolf | F16K 15/20 |
| 1,800,127 A | 4/1931 | Wilson | F16K 1/34 |
| 1,847,385 A | 3/1932 | Franklin | F16K 1/34 |

(Continued)

FOREIGN PATENT DOCUMENTS

| CN | 103492773 | 1/2014 | F16K 1/38 |
|---|---|---|---|
| CN | 104520155 | 4/2015 | B60T 8/36 |

(Continued)

OTHER PUBLICATIONS

International Search Report and Written Opinion and International Preliminary Report on Patentability issued in PCT/JP2021/027769, dated Sep. 7, 2021, 24 pages.

(Continued)

*Primary Examiner* — Paul J Gray
(74) *Attorney, Agent, or Firm* — HAYES SOLOWAY P.C.

(57) ABSTRACT

Provided is a valve capable of accurately moving a valve body in a direction away from a valve seat. A bellows that is expandable and contractible in an axial direction is disposed across the valve body and the valve housing on an axially opposite side of a valve seat through the valve body.

11 Claims, 5 Drawing Sheets

(56) References Cited

U.S. PATENT DOCUMENTS

| | | | | |
|---|---|---|---|---|
| 2,196,798 | A | 4/1940 | Otto | F16K 1/36 |
| 2,267,515 | A | 12/1941 | Wilcox | F16K 31/0627 |
| 2,331,503 | A | 10/1943 | Ray | F16K 41/10 |
| 2,543,010 | A | 2/1951 | Gardner | F16K 31/0655 |
| 2,797,061 | A | 6/1957 | Buchanan | F16K 31/06 |
| 2,887,293 | A | 5/1959 | Fred | F16K 31/60 |
| 2,893,685 | A | 7/1959 | Camp | F16K 1/36 |
| 2,898,082 | A | 8/1959 | Von Almen | F04B 53/1027 |
| 3,049,332 | A | 8/1962 | Webster | F16K 1/02 |
| 3,054,422 | A | 9/1962 | Napolitano | F16K 1/385 |
| 3,070,120 | A | 12/1962 | Wendt | F16K 1/46 |
| 3,185,438 | A | 5/1965 | Smirra | F16K 1/34 |
| 3,204,925 | A | 9/1965 | Enrico | F16K 1/50 |
| 3,230,973 | A | 1/1966 | Rudolf | F16K 1/46 |
| 3,278,156 | A | 10/1966 | Callahan | F16K 41/10 |
| 3,360,304 | A | 12/1967 | Adams | B61K 7/12 |
| 3,394,732 | A | 7/1968 | Constantine | F16K 1/36 |
| 3,426,741 | A | 2/1969 | Haagen | F01L 3/02 |
| 3,483,888 | A | 12/1969 | Hugo | F16K 15/046 |
| 3,623,699 | A | 11/1971 | Matousek | F16K 1/46 |
| 3,627,257 | A | 12/1971 | Stamfil | F16K 31/0693 |
| 3,679,169 | A | 7/1972 | Bedo | F16K 41/0692 |
| 3,854,495 | A | 12/1974 | Cowley | G05D 16/0663 |
| 4,085,921 | A | 4/1978 | Ueda et al. | F16K 31/06 |
| 4,149,699 | A | 4/1979 | Speckmann | F16K 41/00 |
| 4,318,532 | A | 3/1982 | Winkler | F16K 1/34 |
| 4,345,739 | A | 8/1982 | Wheatley | F16K 1/2263 |
| 4,364,615 | A | 12/1982 | Euler | F16C 27/04 |
| 4,417,601 | A | 11/1983 | Bennett | A62C 31/12 |
| 4,448,038 | A | 5/1984 | Barbier | F25B 41/34 |
| 4,474,356 | A | 10/1984 | Baumann | F16K 1/2 |
| 4,579,145 | A | 4/1986 | Leiber | F16H 61/0251 |
| 4,615,358 | A | 10/1986 | Hammond | F15B 13/0402 |
| 4,617,889 | A | 10/1986 | Nishimiya | F02D 31/00 |
| 4,632,358 | A | 12/1986 | Orth | F25B 41/347 |
| 4,669,272 | A | 6/1987 | Kawai | F04B 49/225 |
| 4,687,419 | A | 8/1987 | Suzuki | F04B 27/1804 |
| 4,778,150 | A | 10/1988 | Pratt | F16K 41/043 |
| 4,813,647 | A | 3/1989 | Yagi | F02M 3/075 |
| 4,825,909 | A | 5/1989 | Martin | F15B 13/02 |
| 4,848,729 | A | 7/1989 | Danzy | F16K 1/46 |
| 4,895,192 | A | 1/1990 | Mortenson | F01M 11/04 |
| 4,915,355 | A | 4/1990 | Fort | F16K 1/46 |
| 4,917,150 | A | 4/1990 | Koch et al. | F16K 31/0606 |
| 4,921,208 | A | 5/1990 | LaMarca | F16K 31/0693 |
| 4,922,957 | A | 5/1990 | Johnson | F16K 1/46 |
| 4,923,173 | A | 5/1990 | Szymaszek | F16K 1/36 |
| 4,936,337 | A | 6/1990 | DuHack | F16K 31/408 |
| 4,979,542 | A | 12/1990 | Mesenich | F02M 47/027 |
| 4,998,559 | A | 3/1991 | McAuliffe | F16H 61/0251 |
| 5,011,116 | A | 4/1991 | Alberts | F16K 47/00 |
| 5,048,790 | A | 9/1991 | Wells | F16K 31/408 |
| 5,060,695 | A | 10/1991 | McCabe | G05D 16/2024 |
| 5,217,047 | A | 6/1993 | McCabe | F16H 16/0251 |
| 5,232,195 | A | 8/1993 | Torrielli | H01F 7/1607 |
| 5,246,205 | A | 9/1993 | Gillingham | F01N 3/0212 |
| 5,263,694 | A | 11/1993 | Smith | B60G 15/068 |
| 5,364,066 | A | 11/1994 | Dorste | F25B 41/35 |
| 5,409,036 | A | 4/1995 | Ahmadian | H01F 7/14 |
| 5,439,027 | A | 8/1995 | Layton | F16K 1/385 |
| 5,454,233 | A | 10/1995 | Naujock | F25B 41/34 |
| 5,702,235 | A | 12/1997 | Hirota | F04B 27/1804 |
| 5,778,932 | A | 7/1998 | Alexander | G05D 16/2024 |
| 5,797,730 | A | 8/1998 | Kawaguchi | F04B 49/225 |
| 5,810,030 | A | 9/1998 | Uchiyama | F16K 31/0655 |
| 5,897,096 | A | 4/1999 | Nakano | F16K 41/103 |
| 6,010,312 | A | 1/2000 | Suitou | F04B 27/1804 |
| 6,019,118 | A | 2/2000 | Voggenreiter et al. | F16K 51/02 |
| 6,149,398 | A | 11/2000 | Fukanuma | F04B 27/1804 |
| 6,155,391 | A | 12/2000 | Kashiwagi et al. | F16F 9/348 |
| 6,161,585 | A | 12/2000 | Kolchinsky | F05D 16/2024 |
| 6,257,836 | B1 | 7/2001 | Ota et al. | 417/222.02 |
| 6,280,152 | B1 | 8/2001 | Sugiura | F04B 27/0891 |
| 6,315,266 | B1 | 11/2001 | Hirota | F16K 31/406 |
| 6,321,995 | B1 | 11/2001 | Badovick | F25B 41/335 |
| 6,361,283 | B1 | 3/2002 | Ota | F04B 27/1084 |
| 6,443,420 | B1 | 9/2002 | Hettinger | F16K 31/02 |
| 6,481,976 | B2 | 11/2002 | Kimura | F04B 27/1804 |
| 6,626,000 | B1 | 9/2003 | Meyer | F25B 41/345 |
| 6,772,990 | B2 | 8/2004 | Sasaki et al. | F04B 49/00 |
| 6,776,182 | B2 | 8/2004 | Ishitoya | F16K 25/00 |
| 6,811,140 | B1 | 11/2004 | Maini | F16K 1/46 |
| 6,840,504 | B2 | 1/2005 | Hagiwara | F16K 1/36 |
| 6,959,718 | B2 | 11/2005 | Kayahara | F16K 31/0655 |
| 7,007,917 | B2 | 3/2006 | Choi | F16K 31/0655 |
| 7,040,595 | B2 | 5/2006 | Hirota | F16K 31/02 |
| 7,246,787 | B2 | 7/2007 | Kumar | F16K 31/0675 |
| 7,263,857 | B2 | 9/2007 | Hirota | F25B 41/345 |
| 7,481,417 | B2 | 1/2009 | Mayer | F16K 51/02 |
| 7,533,687 | B2 | 5/2009 | Uemura | F16K 27/048 |
| 7,562,675 | B2 | 7/2009 | Nomichi | F16K 1/443 |
| 7,726,949 | B2 | 6/2010 | Taguchi | F04B 1/26 |
| 7,758,014 | B2 | 7/2010 | Lancaster | F16K 1/04 |
| 7,832,653 | B2 | 11/2010 | Yukimoto | F25B 41/39 |
| 7,958,908 | B2 | 6/2011 | Cho et al. | F15B 13/044 |
| 7,971,797 | B2 | 7/2011 | Habermann | F16K 31/002 |
| 8,021,124 | B2 | 9/2011 | Umemura | F04B 27/1804 |
| 8,079,827 | B2 | 12/2011 | Iwa | F04B 27/1804 |
| 8,128,061 | B2 | 3/2012 | Uemura | F04B 27/1804 |
| 8,225,818 | B1 | 7/2012 | Stephens | F15B 13/0442 |
| 8,328,163 | B2 | 12/2012 | Boesch | F16K 1/36 |
| 8,387,947 | B2 | 3/2013 | Uemura | F04B 27/1804 |
| 8,434,518 | B2 | 5/2013 | Okamoto | F16K 31/0655 |
| 8,469,337 | B1 | 6/2013 | Hoeptner | F16K 1/36 |
| 8,579,257 | B2 | 11/2013 | Taylor | F16K 1/46 |
| 8,651,826 | B2 | 2/2014 | Futakuchi | F04B 27/1804 |
| 8,684,037 | B2 | 4/2014 | Huynh | F15B 13/01 |
| 8,757,592 | B2 | 6/2014 | Marica | F16K 31/00 |
| 8,757,988 | B2 | 6/2014 | Fukudome | F04B 27/1804 |
| 9,022,346 | B2 | 5/2015 | Najmolhoda | F16K 31/0613 |
| 9,027,598 | B2 | 5/2015 | Schneider | F16K 31/0613 |
| 9,086,702 | B2 | 7/2015 | Griffin | G05D 16/185 |
| 9,132,714 | B2 | 9/2015 | Futakuchi | F04B 27/1804 |
| 9,243,733 | B2 | 1/2016 | Lively | G05D 16/02 |
| 9,297,373 | B2 | 3/2016 | Bagagli | F16K 15/026 |
| 9,383,021 | B2 | 7/2016 | Kosmehl | F16K 1/36 |
| 9,400,027 | B2 | 7/2016 | Imaizumi | F16F 1/32 |
| 9,453,518 | B2 | 9/2016 | Schulz | F15B 13/043 |
| 9,470,337 | B2 | 10/2016 | Roper | F16K 1/36 |
| 9,581,149 | B2 | 2/2017 | Ota et al. | F04B 27/1804 |
| 9,581,150 | B2 | 2/2017 | Ota et al. | F04B 27/1804 |
| 9,638,082 | B2 | 5/2017 | Fujita | F16K 25/00 |
| 9,732,874 | B2 | 8/2017 | Saeki | F16K 31/0603 |
| 9,874,286 | B2 | 1/2018 | Bagagli | F16K 15/12 |
| 10,113,539 | B2 | 10/2018 | Sugamura | F04B 27/1804 |
| 10,378,657 | B2 | 8/2019 | Lin | F16K 1/46 |
| 10,519,944 | B2 | 12/2019 | Taguchi | F04B 27/1804 |
| 10,557,463 | B2 | 2/2020 | Sugamura | F04B 27/1804 |
| 10,690,125 | B2 | 6/2020 | Hayama | F04B 27/18 |
| 10,784,804 | B2 | 9/2020 | Sasaki | H02P 25/022 |
| 10,788,140 | B2 | 9/2020 | Lee | F16K 31/02 |
| 10,837,431 | B2 | 11/2020 | Tonegawa | F04B 49/22 |
| 11,085,431 | B2 | 8/2021 | Fukudome et al. | F16K 31/06 |
| 11,092,244 | B1 | 8/2021 | Hu | F16K 1/36 |
| 11,313,475 | B2 | 4/2022 | Lv | F25B 41/35 |
| 11,415,238 | B2 | 8/2022 | Nakanishi | F16K 31/0655 |
| 11,415,240 | B2 | 8/2022 | Muraoka | F16K 31/208 |
| 11,480,166 | B2 | 10/2022 | Hayama et al. | F04B 27/10 |
| 11,519,399 | B2 | 12/2022 | Kurihara | F04B 53/1087 |
| 11,536,389 | B2 | 12/2022 | Fukudome | F16K 31/0655 |
| 11,542,929 | B2 | 1/2023 | Hayama | F04B 27/18 |
| 11,542,931 | B2 | 1/2023 | Hayama | G05D 7/005 |
| 11,555,489 | B2 | 1/2023 | Hayama | F04B 27/10 |
| 11,603,832 | B2 | 3/2023 | Higashidozono | F04B 27/10 |
| 11,950,636 | B2 | 4/2024 | Qiu et al. | A24F 40/95 |
| 12,018,663 | B2 | 6/2024 | Kurihara | F16K 15/184 |
| 12,025,237 | B2 | 7/2024 | Kurihara | F04B 27/1804 |
| 12,031,531 | B2 | 7/2024 | Fukudome | F16K 31/0655 |
| 12,196,464 | B2 | 1/2025 | Ejima | B60H 1/00485 |
| 12,292,130 | B2 | 5/2025 | Ejima | F16K 27/048 |
| 2001/0003573 | A1 | 6/2001 | Kimura et al. | 417/222.2 |
| 2002/0134444 | A1 | 9/2002 | Isobe | F16K 27/041 |
| 2003/0145615 | A1 | 8/2003 | Sasaki | F16K 31/0637 |

(56) References Cited

U.S. PATENT DOCUMENTS

| | | | |
|---|---|---|---|
| 2003/0197141 A1 | 10/2003 | Kajitani | F16L 47/00 |
| 2003/0202885 A1 | 10/2003 | Taguchi | F04B 49/00 |
| 2004/0045305 A1 | 3/2004 | Murase | F25B 49/022 |
| 2004/0165994 A1 | 8/2004 | Umemura | F04B 27/1804 |
| 2005/0076959 A1 | 4/2005 | Yamamoto | F16K 31/0624 |
| 2005/0151310 A1 | 7/2005 | Rodeffer | F16F 1/32 |
| 2005/0163624 A1 | 7/2005 | Taguchi | F04B 27/1804 |
| 2007/0214814 A1 | 9/2007 | Umemura et al. | |
| 2007/0264134 A1 | 11/2007 | Hirota | F04B 27/1804 |
| 2008/0138213 A1 | 6/2008 | Umemura et al. | 417/222.2 |
| 2008/0175727 A1 | 7/2008 | Umemura et al. | F04B 49/22 |
| 2009/0108221 A1 | 4/2009 | Umemura et al. | 251/129.15 |
| 2009/0114871 A1 | 5/2009 | Iwa | F04B 27/14 |
| 2009/0183786 A1 | 7/2009 | Iwa | 137/487.5 |
| 2009/0256091 A1 | 10/2009 | Nordstrom | F16K 31/0613 |
| 2010/0019406 A1 | 1/2010 | Shoji et al. | F16K 1/34 |
| 2010/0051838 A1 | 3/2010 | Uemura | F04B 27/1804 |
| 2010/0252763 A1 | 10/2010 | Courth | F16K 31/0665 |
| 2010/0282991 A1 | 11/2010 | Okamoto | F16K 31/02 |
| 2011/0041941 A1 | 2/2011 | Sonsterod | F16K 15/14 |
| 2011/0061749 A1 | 3/2011 | Okamoto | F16K 31/0655 |
| 2011/0089352 A1 | 4/2011 | Morgan | F16K 11/0716 |
| 2011/0203888 A1 | 8/2011 | Sonsterod | F16F 9/32 |
| 2012/0056113 A1 | 3/2012 | Tano | F04B 27/1804 |
| 2012/0097881 A1 | 4/2012 | Aoyama | F16K 1/425 |
| 2012/0198992 A1 | 8/2012 | Futakuchi et al. | 91/505 |
| 2012/0198993 A1 | 8/2012 | Fukudome | 91/505 |
| 2012/0211686 A1 | 8/2012 | Okamoto | F16K 31/0655 |
| 2013/0291963 A1 | 11/2013 | Futakuchi et al. | 137/487.5 |
| 2014/0099214 A1 | 4/2014 | Fukudome | 417/222.2 |
| 2014/0109973 A1 | 4/2014 | Neumeister | C23C 16/4412 |
| 2014/0130916 A1 | 5/2014 | Saeki | F16K 31/0613 |
| 2014/0162114 A1 | 6/2014 | Suzuki | H01M 2/10 |
| 2014/0294632 A1 | 10/2014 | Kondo et al. | 417/434 |
| 2014/0369862 A1 | 12/2014 | Ota et al. | F04B 27/1804 |
| 2015/0004010 A1 | 1/2015 | Saeki | F04B 27/1804 |
| 2015/0021131 A1 | 1/2015 | Wootten | F16F 9/348 |
| 2015/0027573 A1 | 1/2015 | Ochiai | F15B 13/0402 |
| 2015/0044067 A1 | 2/2015 | Ota et al. | F04B 27/1804 |
| 2015/0068628 A1 | 3/2015 | Iwa | 137/625.65 |
| 2015/0104334 A1 | 4/2015 | Ota et al. | F04B 27/1804 |
| 2015/0275874 A1 | 10/2015 | Ota | F04B 27/1804 |
| 2015/0276065 A1 | 10/2015 | Yoshida | F16K 3/246 |
| 2015/0345655 A1 | 12/2015 | Higashidozono | 137/624.27 |
| 2016/0053755 A1 | 2/2016 | Taguchi | F04B 49/22 |
| 2016/0208954 A1 | 7/2016 | Ito et al. | F16K 39/02 |
| 2016/0290326 A1 | 10/2016 | Sugamura | F04B 27/1804 |
| 2017/0261113 A1 | 9/2017 | Sato | F16K 31/0675 |
| 2017/0284562 A1 | 10/2017 | Hayama | F16K 41/00 |
| 2018/0156345 A1 | 6/2018 | Kanda | F15B 13/0431 |
| 2018/0187793 A1 | 7/2018 | Futakuchi | F04B 39/08 |
| 2018/0238455 A1 | 8/2018 | Yazawa | F16K 31/508 |
| 2018/0291888 A1 | 10/2018 | Tonegawa et al. | F04B 49/22 |
| 2018/0372129 A1 | 12/2018 | Kato et al. | F15B 13/04 |
| 2019/0162175 A1 | 5/2019 | Higashidozono | F04B 27/18 |
| 2019/0261690 A1 | 8/2019 | Lin et al. | H01M 10/42 |
| 2019/0293061 A1 | 9/2019 | Kume | F16K 11/048 |
| 2020/0011444 A1 | 1/2020 | Morita et al. | F16K 31/04 |
| 2020/0032781 A1 | 1/2020 | Higashidozono | F16K 31/0624 |
| 2020/0088178 A1 | 3/2020 | Fukudome et al. | F16K 31/06 |
| 2020/0173580 A1 | 6/2020 | Sandeck | F16K 51/02 |
| 2020/0309105 A1 | 10/2020 | Hayama et al. | F04B 27/18 |
| 2020/0318624 A1 | 10/2020 | Hayama | F04B 27/18 |
| 2020/0325881 A1 | 10/2020 | Hayama et al. | F04B 27/18 |
| 2020/0332786 A1 | 10/2020 | Hayama | F04B 27/1804 |
| 2020/0362974 A1 | 11/2020 | Hayama et al. | F16K 11/24 |
| 2020/0370545 A1 | 11/2020 | Hayama et al. | F04B 27/18 |
| 2021/0372396 A1 | 12/2021 | Kurihara | G05D 7/0635 |
| 2021/0404570 A1 | 12/2021 | Hayama et al. | F16K 17/04 |
| 2022/0213878 A1 | 7/2022 | Fukudome et al. | F04B 27/18 |

FOREIGN PATENT DOCUMENTS

| | | | |
|---|---|---|---|
| CN | 107339442 | 11/2017 | F16K 1/02 |
| CN | 209146387 | 7/2019 | F16K 31/42 |
| CN | 110260001 | 9/2019 | F16K 15/016 |
| CN | 110735965 | 1/2020 | F16K 1/00 |
| CN | 111279076 | 6/2020 | F04B 27/18 |
| CN | 111316028 | 6/2020 | F16K 31/06 |
| CN | 111417780 | 7/2020 | F04B 27/18 |
| DE | 2414893 | 10/1975 | F16K 15/00 |
| DE | 2706439 | 8/1978 | F16K 11/04 |
| DE | 10039066 | 2/2002 | F16K 31/06 |
| DE | 102006033747 | 1/2008 | F16K 31/00 |
| EP | 0229315 | 7/1987 | F02M 3/07 |
| EP | 1519128 | 3/2005 | F25B 41/06 |
| EP | 2180217 | 4/2010 | F16K 31/06 |
| EP | 2594794 | 5/2013 | F04B 27/18 |
| EP | 3056778 | 8/2016 | F16K 31/04 |
| EP | 3258103 | 12/2017 | F04B 27/18 |
| EP | 3296599 | 3/2018 | F16K 1/34 |
| EP | 3366957 | 8/2018 | F16K 1/34 |
| EP | 3726054 | 10/2020 | F04B 27/18 |
| JP | 50134119 | 11/1975 | F16K 17/00 |
| JP | 5682358 | 7/1981 | G03B 15/00 |
| JP | 5740945 | 8/1982 | B21B 39/14 |
| JP | H04171361 | 6/1992 | F04B 49/00 |
| JP | 5346276 | 12/1993 | F25B 41/96 |
| JP | 626454 | 2/1994 | F04B 27/08 |
| JP | H0711313 | 2/1995 | F16K 1/34 |
| JP | H8159320 | 6/1996 | F16K 31/04 |
| JP | H09144931 | 6/1997 | F16K 31/06 |
| JP | H10220926 | 8/1998 | F25B 41/06 |
| JP | 11287281 | 10/1999 | F16F 9/348 |
| JP | 2000110959 | 4/2000 | F16K 15/00 |
| JP | 200020763 | 8/2000 | F16K 31/06 |
| JP | 2000304152 | 11/2000 | F16D 48/02 |
| JP | 2001012534 | 1/2001 | F16F 9/46 |
| JP | 2001501290 | 1/2001 | F16K 31/06 |
| JP | 2001153495 | 6/2001 | F16K 31/06 |
| JP | 2001153498 | 6/2001 | F16K 31/06 |
| JP | 2001165055 | 6/2001 | F04B 27/14 |
| JP | 2001263527 | 9/2001 | F16K 31/06 |
| JP | 10039066 | 2/2002 | F16K 31/06 |
| JP | 2002216803 | 8/2002 | H01M 8/02 |
| JP | 2003004160 | 1/2003 | F16K 31/04 |
| JP | 2003301772 | 10/2003 | |
| JP | 2003314745 | 11/2003 | F16K 51/02 |
| JP | 2003322086 | 11/2003 | F04B 49/00 |
| JP | 2004003468 | 1/2004 | F04B 27/14 |
| JP | 2004052647 | 2/2004 | F02M 25/07 |
| JP | 2004101163 | 4/2004 | F25B 41/06 |
| JP | 2005307817 | 11/2005 | F04B 27/14 |
| JP | 2005351605 | 12/2005 | F16K 1/38 |
| JP | 2006153204 | 6/2006 | F16K 31/04 |
| JP | 2007247512 | 9/2007 | F04B 27/14 |
| JP | 2008157031 | 7/2008 | F04B 27/14 |
| JP | 2008190574 | 8/2008 | F16K 31/06 |
| JP | 2009030752 | 2/2009 | F16K 31/06 |
| JP | 2009115204 | 5/2009 | F16K 31/04 |
| JP | 2009221965 | 10/2009 | F04B 27/14 |
| JP | 2009257523 | 11/2009 | F16K 31/06 |
| JP | 2009275550 | 11/2009 | F04B 49/00 |
| JP | 2010019406 | 1/2010 | F16K 31/04 |
| JP | 2011501798 | 1/2011 | F16K 15/14 |
| JP | 2011525962 | 9/2011 | F16F 9/32 |
| JP | 4822735 | 11/2011 | A43B 23/24 |
| JP | 2012144986 | 8/2012 | F04B 27/14 |
| JP | 2012211579 | 11/2012 | F04B 27/14 |
| JP | 2013024135 | 2/2013 | F04B 27/14 |
| JP | 5167121 | 3/2013 | F04B 27/14 |
| JP | 2013100915 | 5/2013 | F15K 31/06 |
| JP | 2013194918 | 9/2013 | F16K 1/36 |
| JP | 2014080927 | 5/2014 | F04B 27/16 |
| JP | 2014092207 | 5/2014 | F16K 31/06 |
| JP | 2014095463 | 5/2014 | F16K 31/06 |
| JP | 2014194180 | 10/2014 | F04B 27/14 |
| JP | 2015075054 | 4/2015 | F04B 27/14 |
| JP | 20151168 | 5/2015 | F04B 27/14 |
| JP | 2015137546 | 7/2015 | F04B 27/14 |
| JP | 2015178795 | 10/2015 | F04B 27/14 |
| JP | 5983539 | 8/2016 | F04B 27/18 |
| JP | 2016196825 | 11/2016 | F04B 27/18 |
| JP | 2016196876 | 11/2016 | F04B 27/18 |

(56) References Cited

FOREIGN PATENT DOCUMENTS

| | | | | |
|---|---|---|---|---|
| JP | 2016205404 | 12/2016 | ............. | F04B 27/18 |
| JP | 6135521 | 5/2017 | ............. | F04B 27/18 |
| JP | 2017089832 | 5/2017 | ............. | F16K 31/06 |
| JP | 2017180525 | 10/2017 | ............. | F16K 31/04 |
| JP | 2017219060 | 12/2017 | ............. | F16K 37/00 |
| JP | 2018015739 | 2/2018 | ................ | C02F 1/46 |
| JP | 2018035840 | 5/2018 | | |
| JP | 2018115684 | 7/2018 | ............. | B60G 17/08 |
| JP | 2018135954 | 8/2018 | ............. | F16K 31/06 |
| JP | 2018179087 | 11/2018 | ............. | F16K 31/06 |
| JP | 2019002436 | 1/2019 | ................ | F16K 3/26 |
| JP | 2019131725 | 8/2019 | | |
| JP | 2019138473 | 8/2019 | ............. | F16K 1/36 |
| JP | 2019167982 | 10/2019 | ............. | F16K 1/38 |
| JP | 2019183960 | 10/2019 | ............. | F16K 31/06 |
| JP | 2020041606 | 3/2020 | ................ | F16K 1/44 |
| JP | 2020060108 | 4/2020 | ............. | F04B 27/18 |
| KR | 20-0400543 | 10/2005 | ................ | B60S 1/52 |
| KR | 1020050107244 | 11/2005 | ............. | F16K 17/10 |
| KR | 1020080011375 | 2/2008 | ............. | F04B 27/14 |
| KR | 102019001499 | 1/2019 | ............. | F16K 31/06 |
| WO | WO9218795 | 10/1992 | ................ | F16K 1/34 |
| WO | WO2006090760 | 8/2006 | ............. | F04B 27/18 |
| WO | WO2007119380 | 10/2007 | ............. | F04B 27/14 |
| WO | WO2009025298 | 2/2009 | ............. | F16K 31/06 |
| WO | WO2011114841 | 9/2011 | ............. | F04B 27/14 |
| WO | WO2011132438 | 10/2011 | ............. | F16K 31/06 |
| WO | WO2012077439 | 6/2012 | ............. | F04B 27/14 |
| WO | WO2014119594 | 8/2014 | ............. | F04B 27/14 |
| WO | WO2014148367 | 9/2014 | ............. | F16K 31/06 |
| WO | WO2018124156 | 7/2018 | ............. | F16K 31/06 |
| WO | WO2019131482 | 7/2019 | ............. | F04B 27/18 |
| WO | WO2020110925 | 11/2019 | ............. | F04B 27/18 |
| WO | WO2020013169 | 1/2020 | ............. | F04B 27/18 |
| WO | WO2020218284 | 10/2020 | ............. | F04B 27/18 |

OTHER PUBLICATIONS

International Search Report and Written Opinion and International Preliminary Report on Patentability issued in PCT/JP2021/027762, dated Oct. 5, 2021, 20 pages.
International Search Report and Written Opinion and International Preliminary Report on Patentability issued in PCT/JP2021/027766, dated Sep. 7, 2021, 24 pages.
International Search Report and Written Opinion and International Preliminary Report on Patentability issued in PCT/JP2021/027770, dated Oct. 5, 2021, 20 pages.
International Search Report and Written Opinion and International Preliminary Report on Patentability issued in PCT/JP2021/027772, dated Sep. 21, 2021, 24 pages.
International Search Report and Written Opinion and International Preliminary Report on Patentability issued in PCT/JP2021/027767, dated Sep. 7, 2021, 22 pages.
International Search Report and Written Opinion and International Preliminary Report on Patentability issued in PCT/JP2021/030007, dated Nov. 2, 2021, 18 pages.
International Search Report and Written Opinion and International Preliminary Report on Patentability issued in PCT/JP2021/034996, dated Dec. 12, 2021, 18 pages.
International Search Report and Written Opinion and International Preliminary Report on Patentability issued in PCT/JP2021/034990, dated Oct. 19, 2021, 18 pages.
International Search Report and Written Opinion and International Preliminary Report on Patentability issued in PCT/JP2021/034995, dated Dec. 14, 2021, 16 pages.
International Search Report and Written Opinion and International Preliminary Report on Patentability issued in PCT/JP2021/044726, dated Dec. 28, 2021, 17 pages.
International Search Report and Written Opinion and International Preliminary Report on Patentability issued in PCT/JP2022/012340, dated May 31, 2022, 24 pages.

VALVE

TECHNICAL FIELD

The present invention relates to a valve, for example a valve that controls a working fluid.

BACKGROUND ART

A valve used to control a working fluid in various industrial fields includes a valve seat and a valve body that can come into contact with and separate from the valve seat, and can control the pressure or flow rate of the working fluid by adjusting a valve opening degree.

Examples of representative valve forms of such a valve include a spool valve in which a spool that is a valve body moves parallel to an opening that is a valve seat, a butterfly valve in which a valve body includes a rotating shaft, and a lift valve in which a valve body moves orthogonally to an opening that is a valve seat. Among these valves, the lift valve is the most suitable for controlling the flow rate or pressure.

Examples of the lift valve include a pressure control valve that adjusts the pressure of hydrogen gas supplied to a fuel cell as illustrated in Patent Citation 1. The pressure control valve of Patent Citation 1 includes a valve housing including a primary pressure space to which the hydrogen gas is supplied from a gas supply source, a secondary pressure space that supplies the hydrogen gas, which is adjusted in pressure, to a nozzle unit of the fuel cell, and a valve hole that provides communication between the primary pressure space and the secondary pressure space; a valve seat provided on a secondary pressure space side of the valve hole; a rod which is movable in an axial direction by a solenoid and of which a tip is disposed in the secondary pressure space through the primary pressure space and the valve hole; and a valve body which is disposed in the secondary pressure space and which is seated on or unseated from the valve seat by the movement of the rod.

A primary pressure chamber and a back space in which the solenoid is disposed are partitioned off from each other in a sealed state by a bellows of which one axial end is fixed to the rod and of which the other axial end is fixed to an inner peripheral surface of the valve housing, and hydrogen of the primary pressure chamber is prevented from leaking to a solenoid side. An effective pressure-receiving area of the bellows is equal to an opening area of the valve hole. Accordingly, a force that moves the valve body in a direction away from the valve seat due to the fluid pressure in the primary pressure chamber and a force that moves the valve body in a direction toward the valve seat due to the fluid pressure in the primary pressure chamber are cancelled out.

CITATION LIST

Patent Literature

Patent Citation 1: WO 2011/132438 A (PAGE 6 and FIG. 2)

SUMMARY OF INVENTION

Technical Problem

In the valve as described in Patent Citation 1, since the forces acting on the valve body due to the fluid pressure in the primary pressure space are cancelled out, even when the pressure of the gas on an upstream side to be supplied to the primary pressure space varies, an influence on the movement of the valve body can be suppressed. However, since the fluid pressure in the secondary pressure space which varies depending on the usage mode of the valve constantly acts in the direction in which the valve body is brought close to the valve seat, when the valve body is moved in the direction away from the valve seat, the stroke distance of the valve body is changed according to the fluid pressure in the secondary pressure space, so that the valve body cannot be accurately moved in the direction away from the valve seat, which is a problem.

The present invention is conceived in view of such a problem, and an object of the present invention is to provide a valve capable of accurately moving a valve body in a direction away from a valve seat.

Solution to Problem

In order to solve the foregoing problem, a valve according to the present invention includes: a valve housing in which a primary pressure space, a secondary pressure space, and a valve hole providing communication between the spaces are formed; a valve seat provided in the valve housing on a secondary pressure space side with respect to the valve hole; a rod disposed inside the valve housing so as to be movable in an axial direction by a drive source; and a valve body that is disposed in the secondary pressure space, and that is seated on or unseated from the valve seat in accordance with a movement of the rod, wherein a pressure-receiving surface is provided for causing a force to act on the rod in a direction opposite to the secondary pressure space due to a pressure in the primary pressure space, and a bellows that is expandable and contractible in the axial direction is disposed across the valve body and the valve housing on an axially opposite side of the valve seat through the valve body. According to the aforementioned feature of the present invention, since the bellows that is expandable and contractible in the axial direction is disposed on the axially opposite side of the valve seat through the valve body, it is possible to reduce a pressure-receiving area of the valve body on which the fluid pressure in the secondary pressure space acts, and it is possible to accurately move the valve body in a direction away from the valve seat by reducing the influence of a force that is exerted on the valve body by the fluid pressure in the secondary pressure space.

It may be preferable that the bellows has a sealed internal space. According to this preferable configuration, the degree of disposition of the valve is high regardless of a surrounding environment in which the bellows is installed.

It may be preferable that the internal space is in a vacuum state. According to this preferable configuration, since the internal space is in a vacuum state, it is possible to reduce a change in a force acting on the valve body from the bellows, the change being caused by a change in the volume of the internal space due to the expansion and contraction of the bellows.

It may be preferable that an effective pressure-receiving area of the bellows is equal to an effective pressure-receiving area of the valve. According to this preferable configuration, since the force acting on the valve body due to the fluid pressure in the secondary pressure space is canceled out, it is possible to accurately move the valve body regardless of the fluid pressure in the secondary pressure space.

It may be preferable that a biasing member that biases the valve body to one axial side is provided, and the biasing member is disposed in parallel to the bellows. According to this preferable configuration, since the biasing member and the bellows are disposed in parallel to each other at close positions in the axial direction, it is possible to stabilize the expansion and contraction of the bellows in the axial direction caused by a biasing force of the biasing member.

It may be preferable that the valve housing includes a movable member to which one end of the bellows is fixed in a sealed state and which is adjustable in axial position. According to this preferable configuration, it is possible to adjust the degree of expansion and contraction of the bellows and the biasing force of the biasing member at the same time by moving the movable member.

It may be preferable that the biasing member is disposed inside the bellows. According to this preferable configuration, since the fluid pressure in the secondary pressure space does not act on the biasing member, it is possible to cause the biasing force of the biasing member to appropriately act on the valve body.

It may be preferable that the bellows is disposed to be rotatable with respect to the valve housing. According to this preferable configuration, it is possible to suppress the twisting of the bellows caused by the operation of the valve.

Incidentally, the vacuum state in the present invention is "a state of a space filled with a gas having a lower pressure than the normal atmospheric pressure", which is defined by Japanese Industrial Standards (JIS Z 8126).

DESCRIPTION OF EMBODIMENTS

Figure 1:
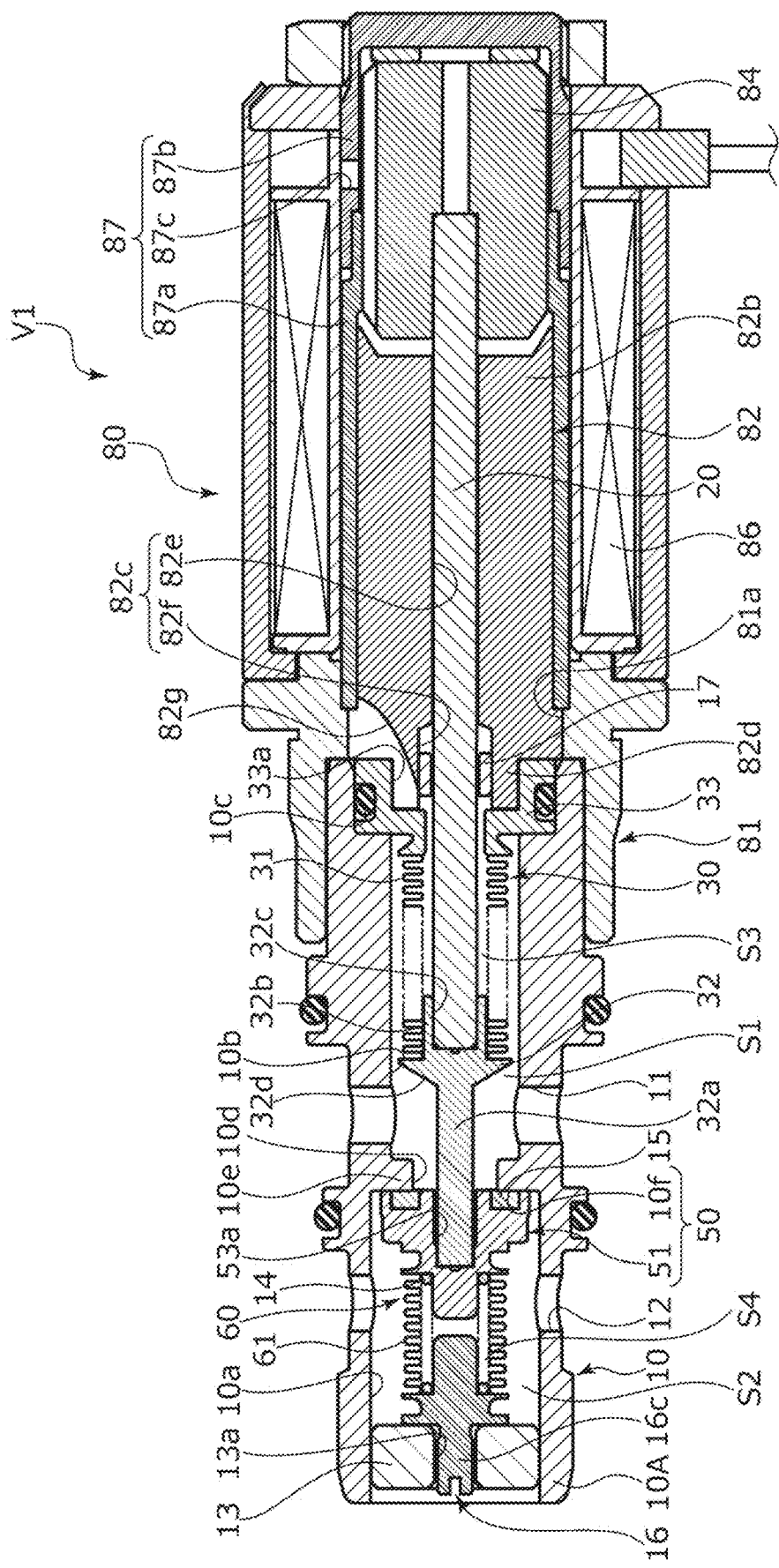
FIG. 1 is a cross-sectional view illustrating a pressure control valve as a valve according to a first embodiment of the present invention.

Modes for implementing a valve according to the present invention will be described below based on embodiments. Incidentally, the embodiments will be described using a pressure control valve as an example; however, the present invention is also applicable to other uses.

First Embodiment

A pressure control valve as a valve according to a first embodiment of the present invention will be described with reference to FIGS. 1 to 3. Hereinafter, the right and left sides when viewed from the front side of FIG. 1 will be described as right and left sides of the pressure control valve. In detail, the left side of the drawing sheets on which a valve housing 10 is disposed and the right side of the drawing sheets on which a solenoid 80 is disposed will be described as the left side of the pressure control valve and the right side of the pressure control valve, respectively.

The pressure control valve in the first embodiment of the present invention adjusts pressure of hydrogen gas (hereinafter, simply referred to as a "fluid") that is a working fluid supplied from a gas supply source, and supplies the hydrogen gas, which is adjusted in pressure, to the outside.

As illustrated in FIG. 1, a pressure control valve V1 of the first embodiment includes the valve housing 10 having a primary pressure space S1 into which the fluid flows from the gas supply source, a secondary pressure space S2 that accommodates the fluid to be supplied to the outside, and a valve hole 10d that provides communication between the primary pressure space S1 and the secondary pressure space S2. An electric current that energizes a coil 86 forming the solenoid 80 as a drive source is adjusted to perform opening and closing control of a valve 50, so that the flow rate flowing into the secondary pressure space S2 from the primary pressure space S1 is changed and a control pressure Pc in the secondary pressure space S2 is variably controlled. Incidentally, a discharge fluid of a discharge pressure Pd of the gas supply source is constantly supplied to the primary pressure space S1, and in the pressure control valve V1, the control pressure Pc in the secondary pressure space S2 is decreased by reducing the valve opening degree of the valve 50, and the control pressure Pc in the secondary pressure space S2 is increased by increasing the valve opening degree of the valve 50.

In the pressure control valve V1 of the first embodiment, the valve 50 includes a valve body 51 and a valve seat 10f formed on a left surface of a partition wall portion 10e extending to a radially inner side of the valve housing 10, and when a seal member 15 disposed on a right side of the valve body 51 comes into contact with and separates from the valve seat 10f in an axial direction, the valve 50 is opened and closed. The valve 50 of the present embodiment is a normally closed type valve that is closed in a non-energized state.

The pressure control valve V1 is mounted and used in a manifold member (not illustrated) having each passage that provides communication between the gas supply source and the outside. The pressure control valve V1 mainly includes the valve housing 10 made of a metal material; the valve body 51 disposed inside the valve housing 10 so as to be reciprocatable in the axial direction; a rod member 20 disposed on an axially right side of the valve body 51; the solenoid 80 connected to the valve housing 10 to exert a driving force on the rod member 20 and the valve body 51; a first bellows 30 disposed between the valve housing 10 and the rod member 20 in a sealed state; and a second bellows 60 as a bellows that is sealed and fixed to an axially left side of the valve body 51, and that partitions an independent internal space S4.

Figure 2:
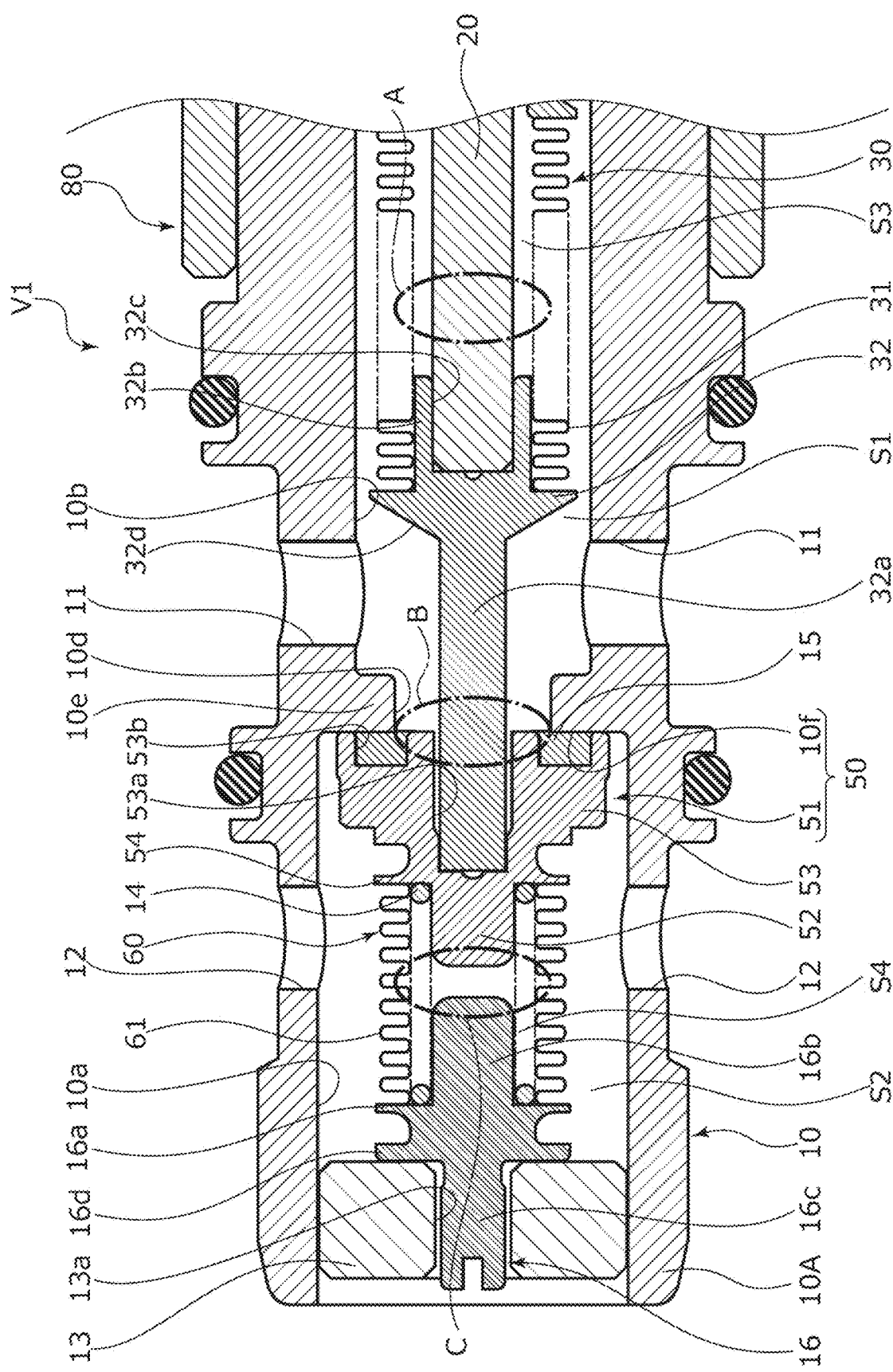
FIG. 2 is an enlarged cross-sectional view of main parts illustrating a state where the pressure control valve is closed in the first embodiment.

As illustrated in FIGS. 1 and 2, the valve housing 10 includes a valve housing main body portion 10A (here, simply referred to as the main body portion 10A), and a lid member 13 and a shaft member 16 as movable members that are adjustable in axial position with respect to the main body portion 10A.

The primary pressure space S1 that communicates with the gas supply source through a plurality of inlet ports 11 penetrating through the main body portion 10A in a radial direction is formed on an axially right side of the main body portion 10A, and the secondary pressure space S2 that communicates with the outside through a plurality of outlet ports 12 penetrating through the main body portion 10A in the radial direction is formed on an axially left side of the main body portion 10A.

A recessed portion 10a which is recessed from an axially left end to the right in the axial direction and of which an axially left end is open is formed in the main body portion 10A.

In addition, the axially left end of the main body portion 10A is closed by the lid member 13 and the shaft member 16, and a space surrounded by an inner peripheral surface and a right end surface forming the recessed portion 10a, the lid member 13, and the shaft member 16 is the secondary pressure space S2. Incidentally, the lid member 13 is screwed and fixed to a left end portion of the main body portion 10A, and the axial fixation position of the lid member 13 is adjustable with respect to the main body portion 10A.

In addition, a through-hole 13a penetrating through the lid member 13 in a right-left direction is formed at a central portion of the lid member 13, a left-end shaft portion 16c of the shaft member 16 is inserted into the through-hole 13a so as to be rotatable relative to the lid member 13, and a large-diameter flange portion 16d of the shaft member 16 is in contact with a right end surface of the lid member 13.

The shaft member 16 includes the left-end shaft portion 16c, the large-diameter flange portion 16d, a flange portion 16a, and a right-end shaft portion 16b in order from an axially left side. The large-diameter flange portion 16d and the flange portion 16a are disposed apart from each other in the axial direction, and a portion connecting the large-diameter flange portion 16d and the flange portion 16a is formed with a smaller diameter than those of the large-diameter flange portion 16d and the flange portion 16a, and with a larger diameter than those of the left-end shaft portion 16c and the right-end shaft portion 16b.

A body portion 61 of the second bellows 60 that is expandable and contractible in the axial direction and a coil spring 14 as a biasing member or biasing means that biases the valve body 51 in an axially right direction that is a valve closing direction of the valve 50 are disposed in parallel to each other between the shaft member 16 and the valve body 51.

The second bellows 60 is formed of the body portion 61 as an accordion-shaped bellows body made of a metal, the shaft member 16 that closes an opening at an axially left end of the body portion 61, and the valve body 51 that closes an opening at an axially right end of the body portion 61.

In detail, the body portion 61 is disposed between the flange portion 16a of the shaft member 16 and a flange portion 54 (refer to FIG. 2) provided at a substantially axially central portion of the valve body 51 to face the flange portion 16a in the axial direction, and is fixed by arbitrary fixing means such as welding. Accordingly, the internal space S4 of the second bellows 60 is partitioned off from the secondary pressure space S2 in a sealed state.

The internal space S4 is filled with a gas having a lower pressure than the atmospheric pressure, thereby resulting in a vacuum state. Incidentally, the body portion 61 of the second bellows 60 is made of a material other than metal.

The coil spring 14 is a push spring, and is disposed inside the second bellows 60, namely, in the internal space S4. In detail, a tip shaft portion 52 of the valve body 51 and the right-end shaft portion 16b of the shaft member 16 are inserted into the coil spring 14. Accordingly, the coil spring 14 is designed to suppress axial deflection (refer to FIG. 2). Namely, the coil spring 14 and the body portion 61 of the second bellows 60 overlap each other in the radial direction.

In addition, the state where the large-diameter flange portion 16d of the shaft member 16 is in contact with the right end surface of the lid member 13 is maintained by a biasing force of the coil spring 14. In addition, since the internal space S4 is in a vacuum state, it is easy to adjust the biasing force of the coil spring 14 based on the vacuum as a reference.

Returning to FIG. 1, a recessed portion 10c in which a radially inner side of an axially right end is recessed to the left in the axial direction is formed in the main body portion 10A, and a communication hole portion 10b that provides communication between the recessed portion 10a and the recessed portion 10c in the axial direction is formed therebetween. The communication hole portion 10b is formed with a smaller diameter than those of the recessed portions 10a and 10c.

In detail, the partition wall portion 10e that partitions the recessed portion 10a and the communication hole portion 10b off from each other is provided in the main body portion 10A so as to extend in a radially inward direction, and the valve hole 10d penetrating through the partition wall portion 10e to the right and left is formed at a radially central portion of the partition wall portion 10e. The valve hole 10d communicates with an axially left side of the communication hole portion 10b.

The first bellows 30 is fixed to the recessed portion 10c in a sealed state. A space surrounded by the first bellows 30 and the communication hole portion 10b is the primary pressure space S1.

The first bellows 30 includes a body portion 31 having a tubular shape and including an accordion pleat that is expandable and contractible in the axial direction; a fixation plate portion 32 that closes an opening at an axially left end of the body portion 31; and a ring portion 33 that is provided at an axially right end of the body portion 31, and that is press-fitted and fixed to the recessed portion 10c.

The body portion 31, the fixation plate portion 32, and the ring portion 33 are made of a metal. The fixation plate portion 32 and the ring portion 33 are formed to be thicker than the body portion 31, and are more rigid than the body portion 31. Incidentally, the body portion 31, the fixation plate portion 32, and the ring portion 33 may be made of different materials, and it is preferable that the fixation plate portion 32 and the ring portion 33 are more rigid than the body portion 31. In addition, the body portion 31, the fixation plate portion 32, and the ring portion 33 may be made of materials other than metal.

An axially left surface of the fixation plate portion 32 is a tapered surface 32d that extends to be reduced in diameter toward the left. A portion on a radially inner side of the tapered surface 32d functions as a pressure-receiving surface facing a pressure-receiving surface that is an axially right end surface of a large-diameter portion 53 of the valve body 51.

In addition, a protruding shaft portion 32a extending to the axially left side is formed on a radially center portion at a left end of the tapered surface 32d of the fixation plate portion 32, and an axially left end portion of the protruding shaft portion 32a, namely, a tip portion is press-fitted and fixed to a recessed portion 53a of the valve body 51 to be described later through the valve hole 10d. The protruding shaft portion 32a and the rod member 20 function as a rod that transmits a moving force to the valve body 51.

A fitting recessed portion 33a that is recessed to the axially left side is formed on a radially inner side of an axially right end of the ring portion 33, and a tubular protrusion 82d of a center post 82 to be described later is inserted into the fitting recessed portion 33a.

As illustrated in FIG. 2, the tip shaft portion 52, the flange portion 54, and the large-diameter portion 53 are formed in order from an axially left end in the valve body 51.

The tip shaft portion 52 has a smaller diameter than those of the flange portion 54 and the large-diameter portion 53, and the flange portion 54 has a smaller diameter than that of the large-diameter portion 53. The large-diameter portion 53 has a larger diameter than that of the valve hole 10d of the valve housing 10.

An axially right end surface of the large-diameter portion 53 is provided with the recessed portion 53a that is recessed to the axially left side at a radially central portion, and with an annular groove portion 53b that is open to an axially right side and that is formed to surround a radially outer side of the recessed portion 53a, and the seal member 15 having an annular shape and made of a rubber material is press-fitted and disposed in the annular groove portion 53b.

The seal member 15 can come into contact with the valve seat 10f provided on an axially left end surface of the partition wall portion 10e of the valve housing 10 at a peripheral edge of the valve hole 10d, and reduces the amount of leakage of the fluid between the valve seat 10f and the valve body 51 to substantially zero in the state where the seal member 15 has come into contact with the valve seat 10f. Incidentally, the seal member 15 is not limited to being made of a rubber material, and may be made of a synthetic resin, a metal, or the like. Furthermore, the valve seat 10f may be formed of a member that is separate from the valve housing 10 and that is press-fitted and fixed to the valve hole 10d.

Returning to FIG. 1, the solenoid 80 mainly includes a casing 81 including an opening portion 81a that is open to the left in the axial direction; the center post 82 that has a substantially cylindrical shape, that is inserted into the opening portion 81a of the casing 81, and that is disposed between a radially inner side of the casing 81 and the radially inner side of the valve housing 10; the rod member 20 which is inserted into the center post 82 so as to be reciprocatable in the axial direction, and of which an axially left end portion is disposed inside the valve housing 10; a movable iron core 84 to which an axially right end portion of the rod member 20 is inserted and fixed; the coil 86 for excitation wound on an outer side of the center post 82 with a bobbin interposed therebetween; and a sleeve 87 that has a bottomed tubular shape, and that accommodates a part of the center post 82, the movable iron core 84, and a part of the rod member 20.

The center post 82 is made of a rigid body that is a magnetic material such as iron or silicon steel, and includes a cylindrical portion 82b in which an insertion hole 82c is formed, the rod member 20 extending in the axial direction being inserted into the insertion hole 82c, and the tubular protrusion 82d extending from a radially inner side of a left end surface of the cylindrical portion 82b to the axially left side.

A portion on an axially right side of the insertion hole 82c is a small-diameter hole portion 82e having a slightly larger diameter than that of the rod member 20, and a portion on an axially left side of the insertion hole 82c is a large-diameter hole portion 82f having a larger diameter than that of the small-diameter hole portion 82e. A bearing 17 having an annular shape is disposed in the large-diameter hole portion 82f, guides the axial movement of the rod member 20, and restricts the rod member 20 from being inclined.

The tubular protrusion 82d is inserted and fitted to the fitting recessed portion 33a of the first bellows 30.

In addition, a cutout portion 82g that is cut out to be open in a radially outward direction from a left end portion of the tubular protrusion 82d to a left end portion of the cylindrical portion 82b is formed in the center post 82. A bottom portion forming the cutout portion 82g extends in an arc shape in the radially outward direction such that a left end portion of the bottom portion protrudes from a position on the axially left side with respect to the bearing 17 and on the axially right side with respect to a left end surface of the tubular protrusion 82d in the radially inward direction in a cross-sectional view. Namely, a left end portion of the cutout portion 82g communicates with the large-diameter hole portion 82f of the insertion hole 82c.

In the state where the tubular protrusion 82d of the center post 82 is fitted to the fitting recessed portion 33a of the first bellows 30, the cutout portion 82g forms a passage that provides communication between a portion on an axially left side of a back space S3 inside the solenoid 80 and a space outside the pressure control valve V1. Namely, the portion on the axially left side of the back space S3 is at the atmospheric pressure.

Incidentally, the portion on the axially left side of the back space S3 referred to here includes a space inside the first bellows 30 and a space on the axially left side with respect to the bearing 17 in the large-diameter hole portion 82f.

The sleeve 87 includes a tubular member 87a into which a part of the center post 82 and a part of the movable iron core 84 are inserted, and a cap member 87b that has a U shape in a cross-sectional view, that is open to the axially left side, and that is connected to an axially right end of the tubular member 87a.

A port 87c penetrating through the cap member 87b in the radial direction is formed in the cap member 87b, and the port 87c provides communication between a portion on an axially right side of the back space S3 inside the solenoid 80 and the space outside the pressure control valve V1. Namely, the portion on the axially right side of the back space S3 is at the atmospheric pressure.

Incidentally, the portion on the axially right side of the back space S3 referred to here includes a space on the axially right side with respect to the bearing 17 in the large-diameter hole portion 82f, a space inside the small-diameter hole portion 82e of the insertion hole 82c, and right and left spaces of the movable iron core 84 inside the sleeve 87.

A slight gap is formed between an inner peripheral surface of the bearing 17 and an outer peripheral surface of the rod member 20, and the portion on the axially right side and the portion on the axially left side of the back space S3 communicate with each other. Namely, the back space S3 inside the solenoid 80 is mainly a space inside the sleeve 87, the space being located on a back side of the valve body 51 and being partitioned off from the primary pressure space S1.

The rod member 20 is inserted into the insertion hole 82c of the center post 82, the axially right end portion of the rod member 20 is inserted and fixed to the movable iron core 84, and the axially left end portion of the rod member 20 is inserted into the body portion 31 of the first bellows 30. In addition, the axially left end portion of the rod member 20 is inserted and fixed to a recessed portion 32c that is recessed to the axially left side on a right end surface of a shaft portion 32b extending from a right surface of the fixation plate portion 32 to the axially right side. Incidentally, the axially left end portion of the rod member 20 may be fixed to the right surface of the fixation plate portion 32 by an adhesive agent, welding, or the like.

In addition, as illustrated in FIG. 2, an effective pressure-receiving area B of the valve body 51 has the same size as that of an opening area of the valve hole 10d. In addition, both an effective pressure-receiving area A of the first bellows 30 and an effective pressure-receiving area C of the second bellows 60 are formed with the same size as that of the effective pressure-receiving area B of the valve body 51 (A=B=C). Incidentally, pressure of the working fluid acting on the valve body 51 will be described in detail later.

Next, an opening and closing operation of the pressure control valve V1 will be described.

First, a non-energized state of the pressure control valve V1 will be described. As illustrated in FIGS. 1 and 2, in a non-energized state of the pressure control valve V1, the biasing force of the coil spring 14 presses the valve body 51 in the axially right direction, namely, in the valve closing direction, so that the seal member 15 of the valve body 51 is seated on the valve seat 10f and the valve 50 is closed.

At this time, when it is assumed that the right in the axial direction is positive, the biasing force ($F_{sp}$) of the coil spring 14, a force ($F_{P1}$) caused by a pressure P1 of the working fluid in the primary pressure space S1, a force ($F_{P2}$) caused by a pressure P2 of the working fluid in the secondary pressure space S2, and a force ($F_{P3}$) caused by an atmospheric pressure P3 in the back space S3 act on the valve body 51 (namely, when it is assumed that the right is positive, a force $F_{rod}=F_{sp}+F_{P1}+F_{P2}-F_{P3}$ acts on the valve body 51). Incidentally, since the internal space S4 is in a vacuum state, and a force $F_{P4}$ acting on the valve body 51 due to the pressure in the internal space S4 is substantially zero, here, the description thereof will be omitted.

Further, at this time, the force acting on the valve body 51 in the axial direction due to the pressure P1 of the working fluid in the primary pressure space S1 and the force caused by the pressure P2 of the working fluid in the secondary pressure space S2 substantially cancel each other out, and the valve body 51 is not affected by the working fluid in the primary pressure space S1 and in the secondary pressure space S2.

Specifically, in the primary pressure space S1, the pressure P1 of the working fluid acts on the effective pressure-receiving area A of the first bellows 30 rightward in the axial direction, and acts on the effective pressure-receiving area B of the valve body 51 leftward in the axial direction. Namely, when it is assumed that the right in the axial direction is positive, the force ($F_{P1}$)=P1×(A−B) caused by the pressure P1 of the working fluid acts on the valve body 51.

Since the effective pressure-receiving area B of the valve body 51 is equal to the effective pressure-receiving area A of the first bellows 30 (A=B), the force ($F_{P1}$) acting on the valve body 51 due to the pressure P1 of the working fluid is substantially zero.

On the other hand, the pressure P2 of the working fluid in the secondary pressure space S2 acts on an area rightward in the axial direction, the area obtained by subtracting the effective pressure-receiving area C of the second bellows 60 from the effective pressure-receiving area B of the valve body 51 on an axially left end surface of the valve body 51. Namely, when it is assumed that the right in the axial direction is positive, the force ($F_{P2}$)=P2×(B−C) caused by the pressure P2 of the working fluid acts on the valve body 51.

Since the effective pressure-receiving area B of the valve body 51 is equal to the effective pressure-receiving area C of the second bellows 60 (B=C), the force ($F_{P2}$) acting on the valve body 51 due to the pressure P2 of the working fluid is substantially zero.

Namely, when it is assumed that the right is positive, substantially the force $F_{rod}=F_{sp}-F_{P3}$ acts on the valve body 51, and the biasing force ($F_{sp}$) of the coil spring 14 is larger than the force ($F_{P3}$) caused by the pressure P3 ($F_{sp}>F_{P3}$), so that the valve body 51 is pressed in the valve closing direction and the valve 50 is closed.

Next, an energized state of the pressure control valve V1 will be described. As illustrated in FIG. 3, in an energized state (namely, during normal control or during so-called duty control) of the pressure control valve V1, when an electromagnetic force ($F_{sol}$) generated by the application of an electric current to the solenoid 80 becomes larger than the force $F_{rod}(F_{sol}>F_{rod})$, the movable iron core 84 is pulled to a center post 82 side, namely, the axially left side, and the rod member 20 fixed to the movable iron core 84 and the valve body 51 move together in an axially left direction, namely, in a valve opening direction, so that the seal member 15 of the valve body 51 separates from the valve seat 10f and the valve 50 is opened.

In addition, when the solenoid 80 is driven, the tip shaft portion 52 of the valve body 51 comes into contact with the right-end shaft portion 16b of the shaft member 16, so that the valve body 51 is restricted from being further separated, namely, unseated from the valve seat 10f.

At this time, the electromagnetic force ($F_{sol}$) to the left in the axial direction and the force $F_{rod}$ to the right in the axial direction act on the valve body 51 (namely, when it is assumed that the right is positive, a force $F_{rod}-F_{sol}$ acts on the valve body 51).

As described above, the pressure control valve V1 can appropriately control the pressure P2 of the working fluid in the secondary pressure space S2 by means of the valve opening degree of the valve 50 which is adjusted through balance between the electromagnetic force ($F_{sol}$) of the solenoid 80 and a difference between the biasing force ($F_{sp}$) of the coil spring 14 and the force ($F_{P3}$) caused by the pressure P3 ($F_{sp}-F_{P3}$).

Incidentally, in the present embodiment, the mode in which a biasing force of the first bellows 30 itself and a biasing force of the second bellows 60 itself do not almost act on the valve body 51 has been provided as an example; however, the biasing force of the first bellows 30 itself and the biasing force of the second bellows 60 itself may act thereon.

As described above, in the pressure control valve V1 of the present embodiment, since the second bellows 60 that is expandable and contractible in the axial direction is provided at a position on the axially opposite side of the valve body 51 from the valve seat 10f over the valve body 51 and the shaft member 16, it is possible to reduce a substantial pressure-receiving area of the valve body 51 on which the fluid pressure in the secondary pressure space S2 acts, due to the second bellows 60, and it is possible to reduce the influence of the force exerted on the valve body 51 by the fluid pressure in the secondary pressure space S2.

For this reason, it is possible to accurately move the valve body 51 in a direction away from the valve seat 10f. In addition, since the valve body 51 can be moved in the direction away from the valve seat 10f by a small electromagnetic force, the configuration of the solenoid 80 can be reduced. Particularly, the present invention is useful for the case of controlling the control fluid at a large flow rate by forming a large opening area of the valve hole 10d.

In addition, since it is possible to reduce the influence of the force acting on the valve body 51 by means of the pressure-receiving surface of the valve body 51 (namely, the axially right end surface of the large-diameter portion 53) and of the pressure-receiving surface of the first bellows 30 facing the pressure-receiving surface, the force being caused by the pressure P1 of the working fluid in the primary pressure space S1, it is possible to accurately move the valve body 51 in the direction away from the valve seat 10f.

In addition, the second bellows 60 has a sealed internal space S4, and the second bellows 60 is expandable and contractible in the axial direction in a sealed state. According to this configuration, since a flow passage is not required which allows the fluid to flow into and out of the internal space S4 when the second bellows 60 is expanded and contracted in the axial direction, the structure can be simplified. Namely, the degree of disposition of the pressure control valve V1 is high regardless of a surrounding environment in which the second bellows 60 is installed.

In addition, since the internal space S4 is in a vacuum state, it is possible to reduce a change in the force acting on the valve body 51, the change being caused by a change in the volume of the internal space S4 due to the expansion and contraction of the second bellows 60. For example, when the second bellows 60 is compressed in the axial direction, it is possible to suppress increase in the fluid pressure in the internal space S4, and it is possible to greatly stroke the second bellows 60 in a compression direction. Further, the force acting on the valve body 51 due to the pressure in the internal space S4 can be substantially zero.

In addition, the effective pressure-receiving area C of the second bellows 60 is equal to the opening area of the valve hole 10d, namely, the effective pressure-receiving area B of the valve body 51. Accordingly, since the force acting on the valve body 51 due to the fluid pressure in the secondary pressure space S2 is canceled out, it is possible to accurately move the valve body 51 regardless of the fluid pressure in the secondary pressure space S2.

In addition, the effective pressure-receiving area A of the first bellows 30 is equal to the effective pressure-receiving area B of the valve body 51. Accordingly, since the force acting on the valve body 51 due to the fluid pressure in the primary pressure space S1 is canceled out, it is possible to accurately move the valve body 51 regardless of the fluid pressure in the primary pressure space S1.

In addition, since the coil spring 14 that biases the valve body 51 to the axially right side is disposed in parallel to overlap the second bellows 60 in the radial direction, it is possible to stabilize the expansion and contraction of the second bellows 60 in the axial direction caused by the biasing force of the coil spring 14.

In addition, the valve housing 10 includes the lid member 13 and the shaft member 16 to which one end of the second bellows 60 is fixed in a sealed state and which are adjustable in axial positions with respect to the main body portion 10A. According to this configuration, it is possible to adjust the degree of expansion and contraction of the second bellows 60 and the biasing force of the second bellows 60 at the same time by changing a distance between the lid member 13 and the valve body 51 through moving the lid member 13.

Figure 3:
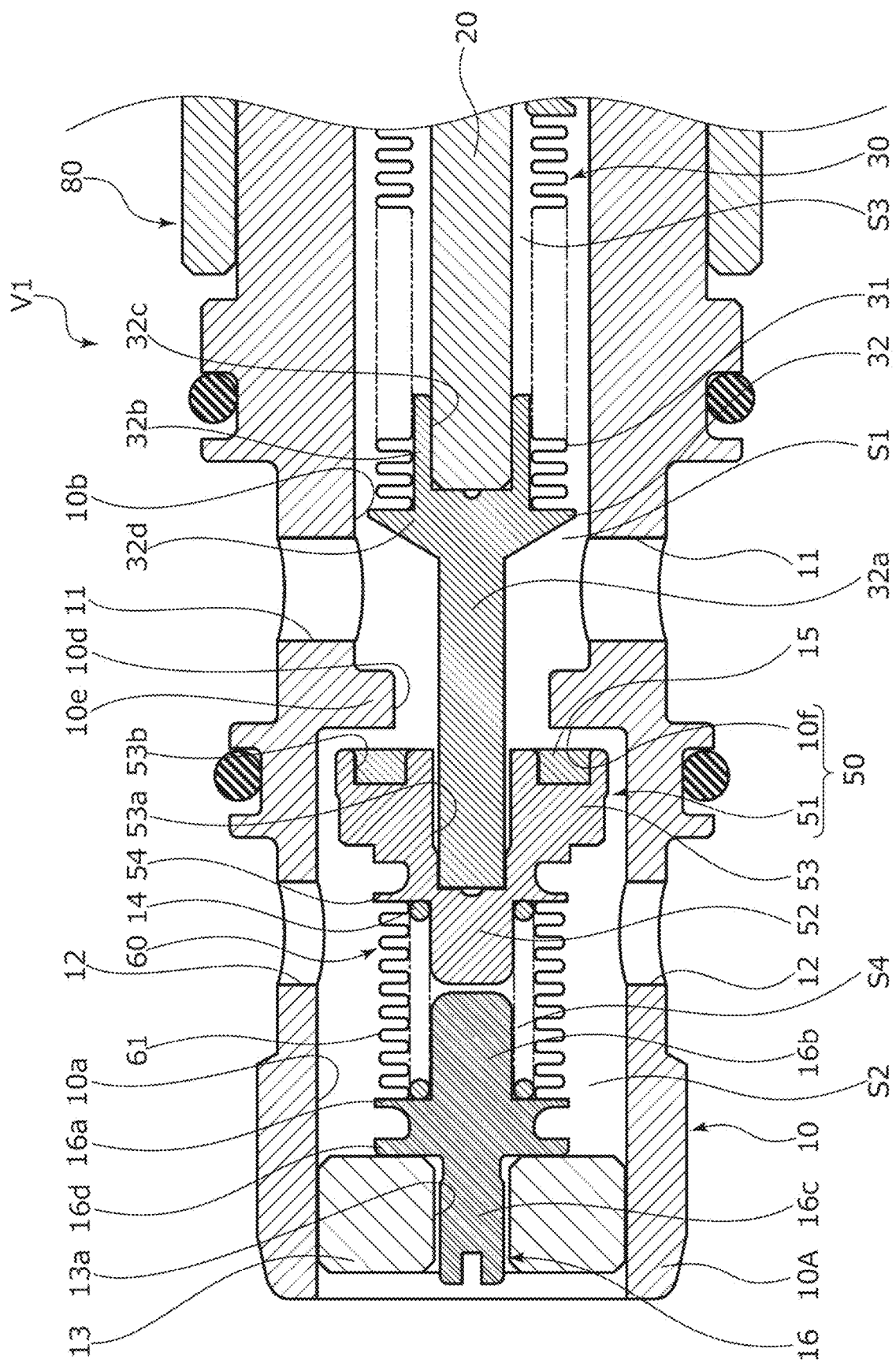
FIG. 3 is an enlarged cross-sectional view of main parts illustrating a state where the pressure control valve is opened in the first embodiment.

With reference to FIGS. 1 to 3, when the distance between the valve body 51 and both the lid member 13 and the shaft member 16 is changed, it is possible to change the screw-in depth of the lid member 13 to any level by rotating only the lid member 13 with respect to the main body portion 10A in a state where the rotation of the shaft member 16 is restricted. In this way, it is possible to prevent the occurrence of twisting of the second bellows 60 or of twisting of the first bellows 30 when the distance between the valve body 51 and both the lid member 13 and the shaft member 16 is changed.

In addition, according to the above configuration, since the second bellows 60 is rotatable relative to the main body portion 10A of the valve housing 10, it is possible to suppress the twisting of the second bellows 60 caused by the operation of the valve 50.

Further, since the internal space S4 is in a vacuum state, it is easy to adjust the biasing force of the coil spring 14 based on the vacuum as a reference.

In addition, since the coil spring 14 is disposed inside the second bellows 60, it is possible to cause the biasing force of the coil spring 14 to appropriately act on the valve body 51 without the fluid pressure in the secondary pressure space S2 or the flow of the working fluid acting on the coil spring 14.

Second Embodiment

Figure 4:
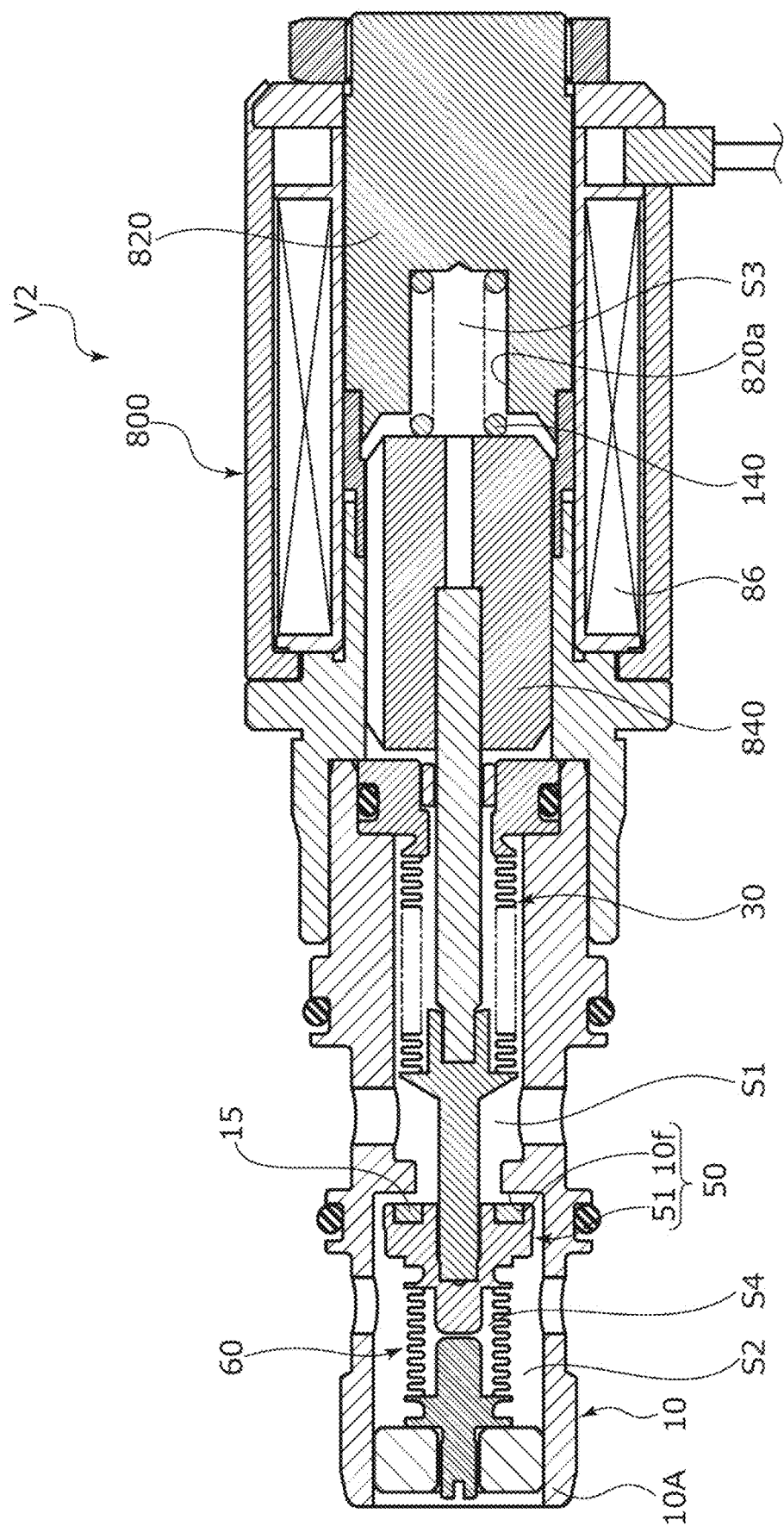
FIG. 4 is a cross-sectional view illustrating a pressure control valve as a valve according to a second embodiment of the present invention.

Next, a pressure control valve as a valve according to a second embodiment of the present invention will be described with reference to FIG. 4. Incidentally, descriptions of the same duplicate configurations as the configurations of the first embodiment will be omitted.

In a pressure control valve V2 of the second embodiment, a coil spring 140 as a biasing member or biasing means is disposed in the back space S3.

In detail, in a solenoid 800, a center post 820 is disposed on the axially right side inside the coil 86, and a movable iron core 840 is disposed on the axially left side inside the coil 86. A recessed portion 820a that is recessed to the axially right side is formed in a radially central portion of a left end portion of the center post 820, and the coil spring 140 is disposed in the recessed portion 820a.

The coil spring 140 has a slightly smaller diameter than a diameter of the recessed portion 820a, is formed to be longer in the axial direction than an axial length of the recessed portion 820a in a non-compressed state, and is disposed between the center post 820 and the movable iron core 840. In other words, the coil spring 140 is disposed apart from the second bellows 60 in the axial direction, and does not overlap the second bellows 60 in the radial direction.

According to the above-described configuration, in a non-energized state of the pressure control valve V2, due to a biasing force of the coil spring 140, the valve body 51 moves to the axially left side, and the seal member 15 separates from the valve seat 10f. Namely, the pressure control valve V2 is a normally open type valve.

In the pressure control valve V2, similarly to the first embodiment, since the force acting on the valve body 51 in the axial direction due to the pressure of the working fluid in the secondary pressure space S2 is substantially cancelled out, when the pressure control valve V2 is switched from an energized state to a non-energized state, the pressure of the working fluid in the secondary pressure space S2 does not affect the movement of the valve body 51 in the valve opening direction.

In addition, since the coil spring 140 is disposed inside the back space S3, the fluid pressure higher than the atmospheric pressure in the primary pressure space S1 and in the secondary pressure space S2 is prevented from acting on the coil spring 140, so that it is possible to cause the biasing force of the coil spring 140 to appropriately act on the valve body 51.

In addition, since the coil spring 140 has a slightly smaller diameter than the diameter of the recessed portion 820a, and almost no gap is formed between the coil spring 140 and an inner peripheral surface of the center post 820 forming the recessed portion 820a, the inclination of the coil spring 140 is restricted by the inner peripheral surface of the center post 820.

Third Embodiment

Figure 5:
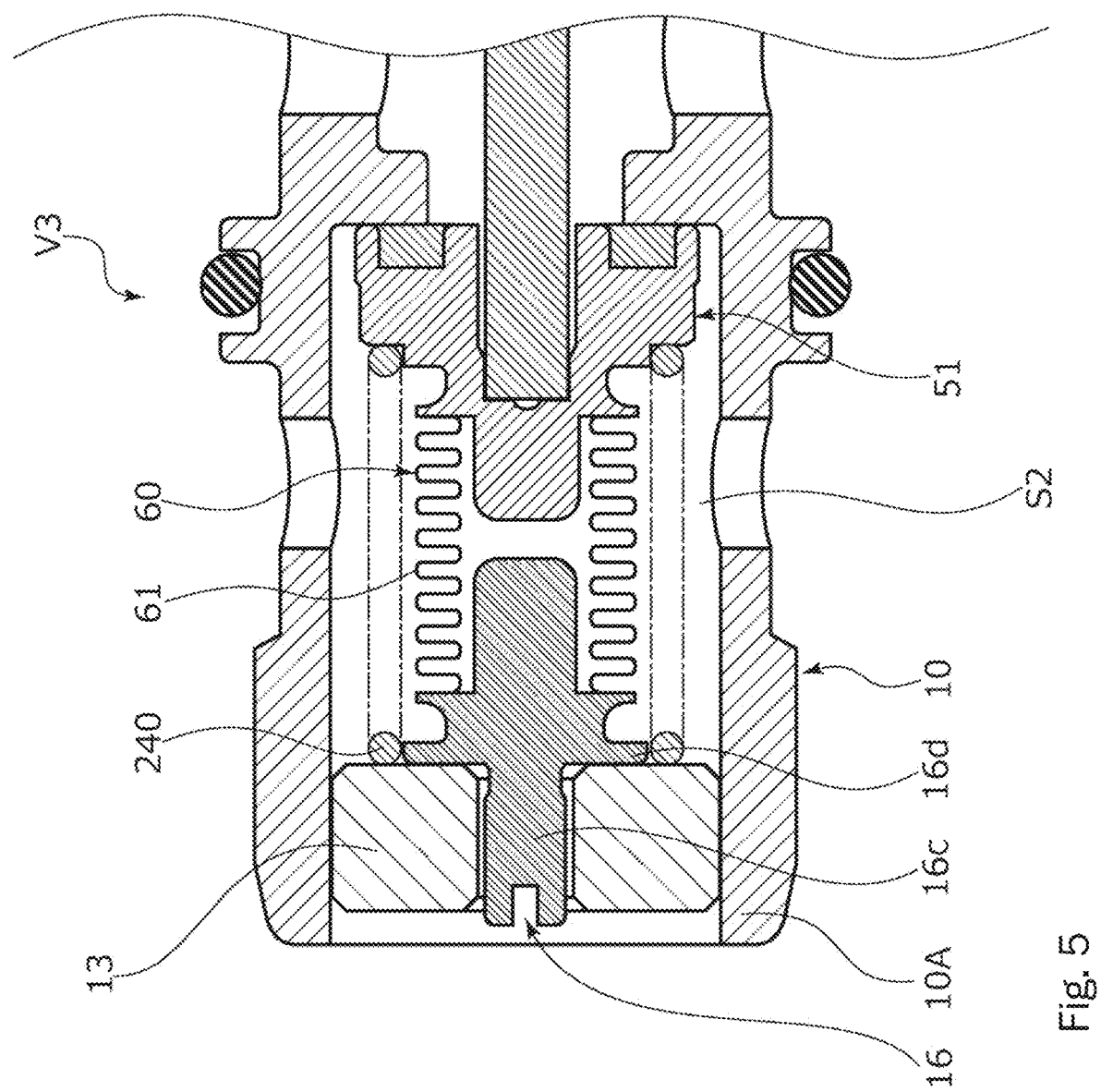
FIG. 5 is an enlarged cross-sectional view of main parts illustrating a pressure control valve as a valve according to a third embodiment of the present invention.

Next, a pressure control valve as a valve according to a third embodiment of the present invention will be described with reference to FIG. 5. Incidentally, descriptions of the same duplicate configurations as the components illustrated in the first embodiment will be omitted.

In a pressure control valve V3 of the third embodiment, a coil spring 240 as a biasing member or biasing means is disposed in the secondary pressure space S2, namely, on a radially outer side of the body portion 61 of the second bellows 60, so as to be parallel to the second bellows 60. According to this configuration, it is possible to stabilize the expansion and contraction of the second bellows 60 in the axial direction caused by a biasing force of the coil spring 240.

Further, since it is not necessary to install the coil spring 240 inside the second bellows 60, the installation of the coil spring 240 is simple. In detail, an inner diameter of the coil spring 240 is formed to be larger than that of the large-diameter flange portion 16d of the shaft member 16, and an axially left end portion of the coil spring 240 is in contact with a right surface of the lid member 13.

For this reason, by connecting the valve body 51 and the shaft member 16 to each other via the body portion 61 of the second bellows 60, then by inserting the coil spring 240 from a shaft member 16 side in the axial direction, by disposing the coil spring 240 on the radially outer side of the body portion 61, and thereafter, by inserting the left-end shaft portion 16c of the shaft member 16 into the through-hole 13a of the lid member 13, it is possible to unitize the second bellows 60 (namely, the body portion 61, the shaft member 16, and the valve body 51), the coil spring 240, and the lid member 13, and it is possible to easily perform assembly work of the pressure control valve V3.

The embodiments of the present invention have been described above with reference to the drawings; however, the specific configurations are not limited to the embodiments, and the present invention also includes changes or additions that are made without departing from the scope of the present invention.

For example, in the first to third embodiments, the mode in which the effective pressure-receiving area of the second bellows is formed to be equal to the effective pressure-receiving area of the valve body and the force acting on the valve body due to the fluid pressure in the secondary pressure space is canceled out has been provided as an example; however, the present invention is not limited to the mode, and it is desirable that the influence of the force acting on the valve body due to the fluid pressure in the secondary pressure space is reduced. For example, the effective pressure-receiving area of the second bellows may be slightly smaller or larger than the effective pressure-receiving area of the valve body. As described above, in the case where the effective pressure-receiving areas of the second bellows and the valve body are different from each other, it is preferable that the state where the valve body is in contact with the valve seat is easily maintained by forming the effective pressure-receiving area of the second bellows smaller than the effective pressure-receiving area of the valve body.

In addition, in the first to third embodiments, the mode in which the effective pressure-receiving area of the first bellows is formed to be equal to the effective pressure-receiving area of the valve body and the force acting on the valve body due to the fluid pressure in the primary pressure space is canceled out has been provided as an example; however, the present invention is not limited to the mode, and it is desirable that the influence of the force acting on the valve body due to the fluid pressure in the primary pressure space is reduced. For example, the effective pressure-receiving area of the first bellows may be slightly smaller or larger than the effective pressure-receiving area of the valve body.

In addition, in the first to third embodiments, the mode in which the primary pressure space and the back space are partitioned off each other by the first bellows has been provided as an example; however, the primary pressure space and the back space may be partitioned off from each other by causing the rod and the valve housing or the casing of the solenoid to slide against each other. Namely, the primary pressure space and the back space may communicate with each other through a slight gap between the outer peripheral surface of the rod and the inner peripheral surface of the valve housing or of the casing of the solenoid.

In addition, in the first to third embodiments, the mode in which the pressure-receiving surface that causes the force caused by the pressure in the primary pressure space, to act on the rod in the valve closing direction is provided on the first bellows; however, a small-diameter portion and a large-diameter portion may be provided on a valve body side of the rod and on a solenoid side of the rod, respectively, and a step between the small-diameter portion and the large-diameter portion may serve as a pressure-receiving surface.

In addition, in the first to third embodiments, the configuration in which the valve body and the rod are formed as separate members has been provided as an example; however, the present invention is not limited to the configuration, and the valve body and the rod may be integrated.

In addition, in the first to third embodiments, the mode in which the internal space of the second bellows is sealed has been provided as an example; however, the internal space of the second bellows may communicate with the external space. In this case, it is desirable that the fluid pressure in the external space may be lower than the fluid pressure in the secondary pressure space.

In addition, in the first to third embodiments, the mode in which the sealed internal space of the second bellows is in a vacuum state has been provided as an example; however, the internal space of the second bellows may be filled with a fluid having a lower pressure than the fluid pressure in the secondary pressure space.

In addition, in the first and third embodiments, the mode in which the biasing member is a push spring has been provided as an example; however, the biasing member may be a pull spring. In addition, the biasing member is not limited to a coil spring, and may be a plate spring or the like.

In addition, in the first embodiment, the mode in which the biasing member is disposed in the internal space has been provided as an example, in the second embodiment, the mode in which the biasing member is disposed in the back space has been provided as an example, and in the third embodiment, the mode in which the biasing member is disposed in the secondary pressure space has been provided as an example; however, the biasing member may be disposed in the primary pressure space.

In addition, in the first to third embodiments, the mode in which the movable members form the valve housing has been provided as an example; however, the movable members may not form the valve housing. Specifically, the movable members and the valve housing may not form the secondary pressure space, the movable members are movable relative to the valve housing, and the relative position between the movable members and the valve housing may be fixable.

In addition, in the first to third embodiments, the example in which the valve body comes into surface contact with the valve seat in an annular shape has been described; however, for example, the valve body may come into line contact with the valve seat in an annular shape.

In addition, in the first to third embodiments, the example in which the effective pressure-receiving area B of the valve body is equal to the opening area of the valve hole 10d has been described; however, the effective pressure-receiving area B may be set to be larger than the opening area of the valve hole by employing a configuration in which the valve body comes into contact with a location outside the valve hole in the radial direction.

In addition, in the first and second embodiments, the mode in which the solenoid is used as a drive source that moves the valve body has been provided as an example; however, a drive source other than the solenoid may be used to move the valve body.

In addition, in the first to third embodiments, the example in which the valve is a pressure control valve has been described; however, the valve may be, for example, an expansion valve disposed between a condenser and an evaporator in an air conditioning system, a capacity control valve assembled into a variable capacity compressor in an air conditioning system, or the like.

REFERENCE SIGNS LIST

10 Valve housing
10A Main body portion
10d Valve hole
10f Valve seat
13 Lid member (movable member)
14 Coil spring (biasing member)
16 Shaft member (movable member)
20 Rod member (rod)
30 First bellows
32a Protruding shaft portion (rod)
50 Valve
51 Valve body
60 Second bellows
61 Body portion
80 Solenoid (drive source)
140, 240 Coil spring
800 Solenoid (drive source)
A to C Effective pressure-receiving area
P1 to P3 Pressure
S1 Primary pressure space
S2 Secondary pressure space
S3 Back space
S4 Internal space
V1 to V3 Pressure control valve

The invention claimed is:

1. A valve, comprising:
 a valve housing in which a primary pressure space, a secondary pressure space, and a valve hole providing communication between the spaces are formed;
 a valve seat provided in the valve housing on a secondary pressure space side with respect to the valve hole;
 a rod disposed inside the valve housing so as to be movable in an axial direction by a drive source; and
 a valve body that is disposed in the secondary pressure space, and that is seated on or unseated from the valve seat in accordance with a movement of the rod,
 wherein a pressure-receiving surface is provided for causing a force to act on the rod in a direction opposite to the secondary pressure space due to a pressure in the primary pressure space,
 the valve housing includes a main body portion, a lid member that is adjustable in the axial position with respect to the main body portion and that has a through hole in the axial direction, and a shaft member that is partially inserted into the through hole of the lid member such that the shaft member is rotatable with respect to the lid member, wherein the lid member and the shaft member partially define the secondary pressure space, and
 a bellows that is expandable and contractible in the axial direction is disposed across the valve body and the shaft member on an axially opposite side of the valve seat through the valve body.

2. The valve according to claim 1,
 wherein the bellows has a sealed internal space.

3. The valve according to claim 2,
 wherein the internal space is in a vacuum state.

4. The valve according to claim 1,
 wherein an effective pressure-receiving area of the bellows is equal to an effective pressure-receiving area of the valve.

5. The valve according to claim 1,
 wherein a biasing member that biases the valve body to one axial side is provided, and the biasing member is disposed in parallel to the bellows.

6. The valve according to claim 5,
 wherein the biasing member is disposed inside the bellows.

7. The valve according to claim 2,
 wherein an effective pressure-receiving area of the bellows is equal to an effective pressure-receiving area of the valve.

8. The valve according to claim 2,
 wherein a biasing member that biases the valve body to one axial side is provided, and the biasing member is disposed in parallel to the bellows.

9. The valve according to claim 3,
 wherein an effective pressure-receiving area of the bellows is equal to an effective pressure-receiving area of the valve.

10. The valve according to claim 3,
 wherein a biasing member that biases the valve body to one axial side is provided, and the biasing member is disposed in parallel to the bellows.

11. The valve according to claim 4,
 wherein a biasing member that biases the valve body to one axial side is provided, and the biasing member is disposed in parallel to the bellows.

* * * * *